United States Patent Office 3,327,212
Patented June 20, 1967

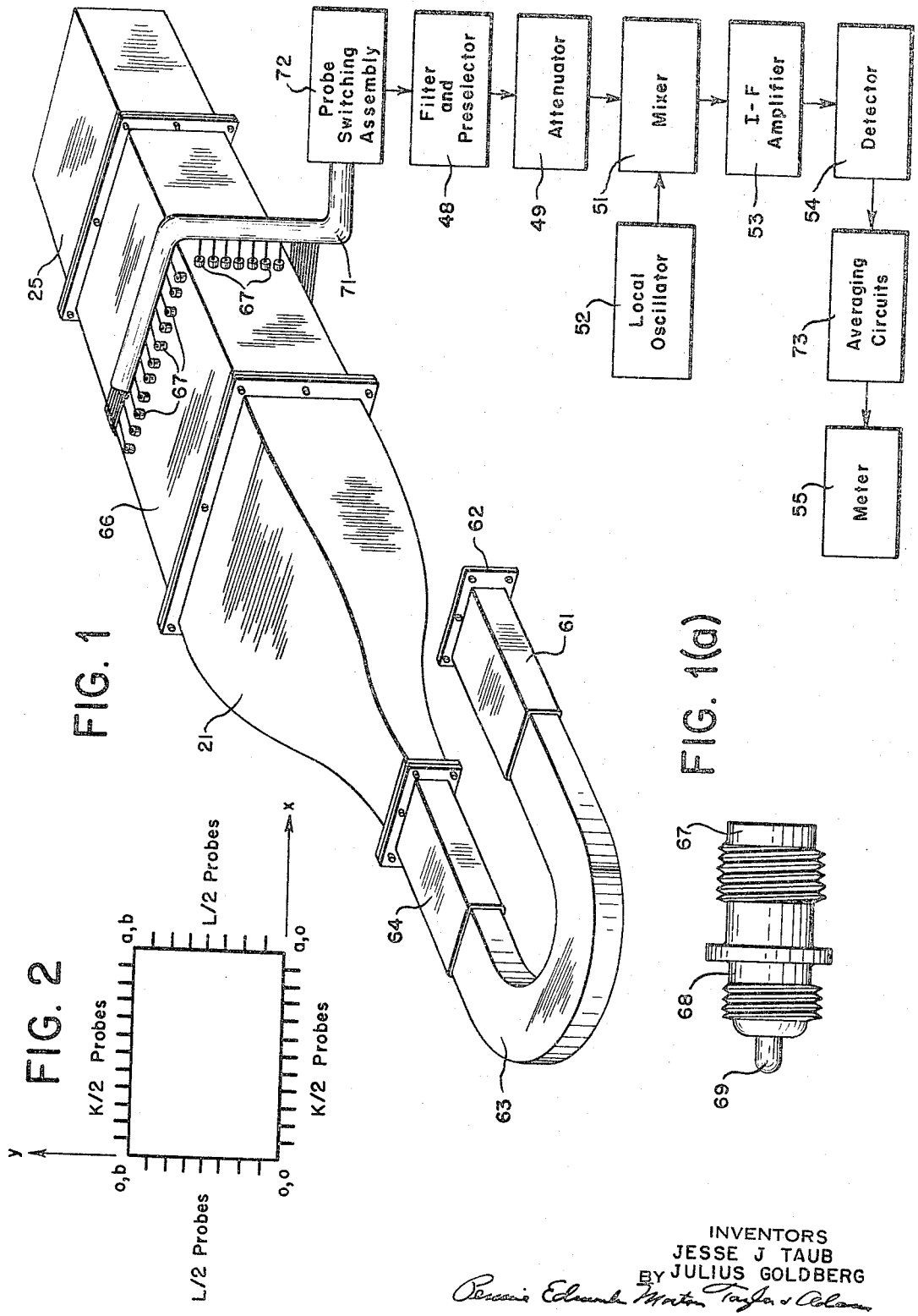

3,327,212
MULTI-MODE MICROWAVE POWER METER HAVING OVERSIZED MEASURING WAVEGUIDE SECTION WITH PROBES ON ALL FOUR WALLS
Jesse J. Taub and Julius Goldberg, Plainview, N.Y., assignors to Cutler-Hammer, Inc., Milwaukee, Wis., a corporation of Delaware
Filed Feb. 7, 1963, Ser. No. 257,003
3 Claims. (Cl. 324—95)

This invention relates to the measurement of multi-mode power propagating in a transmission line, and particularly to the measurement of such power in frequency bands above the desired operating frequency.

Microwave transmitter tubes frequently develop substantial amounts of power at frequencies other than the desired operating frequency. These spurious emissions may be harmonically or non-harmonically related to the fundamental operating frequency. The spurious emissions may adversely affect components of the system in which the transmitter tube is used, or the operation thereof. Perhaps more important, spurious emissions from one system may cause serious interference in other nearby systems. Accordingly it is desirable to be able to measure the power of the spurious emissions at various frequencies.

When the output of such a transmitter tube is coupled to a transmission line such as a waveguide, the spurious emissions may propagate in a considerable number of modes, depending upon their frequencies, the dimensions of the transmission line, discontinuities in the line, etc. Even though the waveguide may be selected so that modes other than the dominant mode are beyond cutoff at the fundamental operating frequency, this in general will not be true for frequencies above the operating frequency. For example, at the third harmonic of the operating frequency it may be found that the hollow rectangular waveguide can support not only the dominant $TE_{10}$ mode but also of the order of fifteen higher modes. At the fifth harmonic of the operating frequency there may be of the order of thirty-five higher modes. Usually there will be a different cutoff frequency in the waveguide for each of the higher modes, except for TE and TM modes of the same order.

In general, different modes propagate in the waveguide at different phase velocities and have different wavelengths in the guide. Thus, at different cross-sections of the waveguide the relative phases of the various modes will be different at a particular frequency of interest. Also, the relative phases at a given cross-section for different frequencies of interest may be different. The variation of phase velocity and wavelength is particularly large near the regions of cutoff for the various modes. These factors make it difficult to measure the multi-mode power at harmonic frequencies, or other frequencies of interest.

In an application S.N. 256,864 of Taub entitled, Multi-Mode Microwave Power Measurement Utilizing Oversized Measuring Waveguide Section To Obtain Plane Wave Propagation filed concurrently herewith, multi-mode power measuring equipment is described employing a measuring transmission line having cross-sectional dimensions substantially larger than the cross-sectional dimensions of the transmission line in which power flow is to be measured. The large measuring section is coupled to the transmission line through a tapered section which provides a smooth transition and avoids reflections and mode generation of its own. In the large measuring section, mode cutoff frequencies are substantially lower than the cutoff frequencies of like modes in the small transmission line, and substantially plane wave propagation approaching free-space conditions exists for all modes which can be coupled thereto from the smaller line.

Measurements of the field intensities in the large measuring section are made at a plurality of points transverse to the direction of propagation therein, and simple computations involving squaring and averaging of the sampled field intensities suffice to give a measurement of multimode power to a high degree of accuracy.

In that application measuring apparatus using either sliding or fixed probes is described. With fixed probes at a single cross-section of the oversize measuring waveguide section it is pointed out that error terms exist, arising out of cross-products of different modal field amplitudes and phases. These error terms may be substantially reduced by employing a line stretcher in the transmission line ahead of the measuring section, making measurements for several lengths of the line stretcher, and averaging the results obtained. Although it is possible to arrange the fixed probes on only one wide and one narrow wall, it has been found that the error terms are markedly reduced and become less significant when measurements are made on all four walls.

The present invention is directed to making the measurements on all four walls of an enlarged rectangular waveguide measuring section. With measurements made on all four walls, it has been found that many of the error terms cancel. Although the importance of the remaining error terms depends upon the particular modal content in the waveguide, it has been found in general that this cancellation greatly facilitates the obtaining of accurate power measurements with the fixed probe technique.

The invention will be explained in connection with a specific embodiment thereof shown in the drawings, in which:

FIG. 1 is a perspective view of the measuring apparatus employing fixed probes and a line stretcher, with receiver circuits shown in block diagram form;

FIG. 1(a) is a detail of a suitable fixed probe; and

FIG. 2 is a diagram illustrating the location of the probes along the broad and narrow waveguide walls.

FIGS. 1, 1(a) and 2 are the same as FIGS. 7, 7(a) and 8 of the aforesaid Taub application, and the same numbers are employed.

Referring to FIG. 1, an input waveguide section 61 is provided with a flange 62 for connection with the waveguide in which the multi-mode power is propagating. A line stretcher 63 is provided, and here takes the form of a so-called "trombone" to facilitate adjustment without requiring movement of associated apparatus. Section 63 is slidable within section 61 and within an output section 64. Spring fingers may be used in the sliding sections to provide good coupling for all modes and frequencies of interest. Section 64 is connected through a tapered waveguide section 21 to an enlarged waveguide measuring section 66. A multi-mode load 25 is coupled to the measuring section 66 so as to provide a substantially matched load for all frequencies and modes of interest, thereby avoiding reflections.

Measuring section 66 is provided with a plurality of probes 67 spaced along each of the four walls of the waveguide. The number of probes depends on the order of the highest modes to be included in the measurement. In one specific embodiment eleven probes were used along each of the broad walls of the waveguide, and seven along each of the narrow walls, in order to include modes having indices up to $m=11$ and $n=7$.

The probes may take the form shown in FIG. 1(a), which is a conventional coaxial connector having an outer wall 68 and an inner conductor 69 rounded at its end. The probe is threaded for insertion into the waveguide wall and for connection of a coaxial cable thereto. To avoid materially affecting the fields normally existing within the waveguide, the probes are advantageously designed so as to provide an output sample which is small compared to the power flowing in the waveguide. A decoupling of the order of 40 db has been employed with success.

The outputs of probes 67 are supplied to respective coaxial lines, here shown as forming a cable 71. The lines are connected to a probe switching assembly 72 which allows the output of each probe to be supplied to the receiver. The receiver is here shown as of the superheterodyne type. The output of the probe switching assembly 72 is supplied to a filter and preselector 48 which selects the desired frequency of interest. The power at the fundamental operating frequency may be expected to be large compared to the spurious power. Hence, filter 48 should be designed to strongly attenuate the fundamental frequency. If only one higher frequency is of interest, a fixed preselector designed to pass a narrow band at the desired frequency may be employed. Or, a preselector tunable over the frequency range of interest may be employed.

The output of the filter and preselector is supplied through an attenuator 49 to a mixer 51. For low power measurements a highly sensitive receiver is required in order to secure output signals of adequate amplitude. However, at high power levels the signals from the probes may be excessive. Attenuator 49 may be adjustable to accommodate a large range of power levels. Mixer 51 is supplied with a local oscillator frequency from 52. The resultant intermediate frequency is amplified in 53 and detected in 54.

As will be developed hereinafter, the squares of the electric field intensities are to be averaged. The probe switching assembly 72 can be arranged for manual operation and the receiver designed to give an output from detector 54 which is proportional to the magnitude of the electric field in the waveguide. The probes and receiver may be calibrated to determine the constant of proportionality. The detector output may be indicated on a meter, and the meter indications may then be squared and an average taken in known manner. Or, detector 54 can be designed as a square law detector or a squaring circuit employed after the detector so that squared values of the electric field components can be read directly, and then averaged.

In the arrangement of FIG. 1, however, it is assumed that the probe switching assembly 72 can be switched fast enough so that electronic averaging can be employed. This may be accomplished by an automatic switching mechanism, such as the commutator arrangement shown in FIG. 9 of the aforesaid Taub application. Hence, the output of detector 54 is fed to averaging circuits 73. Circuits 73 may be designed in conventional manner to average the outputs of detector 54 if the latter represent the squared values of the electric field. If a receiver and detector are linear, circuit 73 may include a squaring circuit before the average is obtained. The average is then indicated on meter 55.

Before discussing the functioning of the line stretcher 63, the basis for the overall power measurement will be given. As developed in the aforesaid Taub application, the power measured by the apparatus of FIG. 1 may be expressed as:

$$P_a = \frac{ab}{2\eta}\left[\frac{1}{K}\sum_{k=1}^{K}|E_{y_k}|^2 + \frac{1}{L}\sum_{l=1}^{L}|E_{x_l}|^2\right] \quad (1)$$

Here K is the number of broad wall probes and L is the number of narrow wall probes. The relationships are further shown in FIG. 2. There will be a constant of proportionality depending on the details of probe and receiver design which can be determined by calibration in a particular application.

Equation 1 relates to the true power P flowing past the fixed probe cross-section as follows:

$$P_a = P + \text{error terms} \quad (2)$$

Actually, in this equation there may be an additional slight error due to the finite dimensions of the enlarged waveguide section 66, as explained in the aforesaid Taub application. However, if the cross-sectional dimensions of the measuring section 66 are about three times that of the standarded waveguide section 61 to which it is coupled, the maximum additional error will be of the order of 6%, and the error may be considerably less in a particular application. Somewhat smaller measuring cross-sections may be employed in particular cases where the resultant error is acceptable.

The error terms in Equation 2 arise out of cross-products of different modal field amplitudes and phases. Analytical expressions can be obtained for the error terms, and they are found to be of the form $E_{mn_1}$, $E_{mn_2}$ for the $y$ field components and $E_{m_1 n}$, $E_{m_2 n}$ for the $x$ field components, where $n_1$ does not equal $n_2$ and $m_1$ does not equal $m_2$. Here, $mn$ represents the mode indices in the usual manner. The total error involves a summation of individual error terms of the type just given and, with a number of modes present, a considerable number of error terms can be present. The error terms are found to be real quantities that can be either positive or negative, with equal probability depending on the time phases of the modal amplitudes. A detailed mathematical development is given in a paper by Taub entitled "A New Technique for Multimode Power Measurement," Transactions of the IRE Professional Group on Microwave Theory and Techniques, November 1962.

It has been found that by making measurements with probes similarly disposed on both broad walls of the measuring waveguide section and with probes similarly disposed on both narrow walls, and averaging the squared values of all the readings thus obtained, many of the error terms cancel. Specifically, if, in a given cross-product for the $y$ field components the sum of the indices $n_1 + n_2$ is odd, that product cancels. Similarly, for the $x$ field components if the sum of the indices $m_1 + m_2$ is odd, that cross-product cancels. Accordingly, the total effect of the error terms will be less significant in the overall power measurement. Conceivably, there can be modal fields where the sums of the indices given above are mostly even, and the cross-products do not cancel. However, it has been found that in many practical applications this is not true, and an advantage is obtained by taking measurements along all four walls.

If measurements are made with only one setting of the line stretcher 63, or the line stretcher omitted, the resulting power measurement will be in error due to the error terms just discussed, but the error will in general be less with probes on all four walls than on only one broad and one narrow wall.

As explained in the above-mentioned Taub application, by making power measurements with various settings of the line stretcher 63 and averaging the power readings thus obtained, the error terms may be averaged out, and more accurate power measurement obtained. Changing the length of the line in the smaller waveguide section changes the relative phase of the various modes in the measuring cross-section. By adjusting the line stretcher to different positions until readings approximately repeat, and averaging the readings, the error terms are substantially averaged out. It has also been found that by moving the line stretcher sufficiently to yield maximum and minimum power readings and taking the average of these readings, accuracies can be obtained which are also satisfactory for most purposes. The amount of line stretching employed will depend on the modal content and the desired accuracy, but in general a variation of the order of six free-space wavelengths has been found sufficient. If desired the line stretcher may be motor driven to facilitate measurement in a short time.

With the elimination of a substantial number of the error terms by making measurements on all four walls in accordance with the present invention, the accuracy obtainable with this procedure is substantially improved, and accuracies of a fraction of a db have been obtained.

We claim:
1. In the measurement of multi-mode electromagnetic wave power propagating in a waveguide by measuring the field strengths at a plurality of points aligned transversely to the direction of propagation and utilizing the measurements to provide an indication of the power, apparatus which comprises, a first waveguide section, a source of electromagnetic waves coupled to said first waveguide section and supplying thereto electromagnetic waves at a fundamental frequency and also supplying waves at frequencies higher than said fundamental frequency that propagate in said first waveguide section in a plurality of modes higher than their dominant modes, a measuring waveguide section possessing propagating characteristics for said waves in said higher modes that yield cutoff frequencies therein which are sufficiently below the cutoff frequencies of like modes in said first waveguide section to obtain substantially plane wave propagation of said waves in said measuring waveguide section, coupling means for coupling said measuring waveguide section with said first waveguide section to supply said waves in said plurality of modes to the measuring waveguide section, and a plurality of field sampling means fixedly spaced completely around said section of waveguide and in coupling relationship with electromagnetic waves therein for sampling the field strengths of electromagnetic waves propagating in said plurality of modes.

2. The combination claimed in claim 1 wherein said measuring waveguide section has a rectangular cross-section and said field sampling means are disposed on each of the four walls thereof.

3. The combination claimed in claim 2 wherein said field sampling means are associated in pairs, the sampling means of each pair being disposed directly opposite each other on opposite walls of the waveguide section.

References Cited

Fouer, Max P. and Tomiyasu, Kiyo: Determination of Higher Order Propagating Modes in Wave-Guide Systems, in Journal of Applied Physics, vol. 29, No. 7, p. 1040, July 1958.

V. G. Price: "Measurement of Harmonic Power Generated by Microwave Transmitter," IRE Trans. on Microwave Theory and Techniques, vol. MTT-7, pp. 116-120, January 1959.

WALTER L. CARLSON, *Primary Examiner.*

RUDOLPH V. ROLINEC, *Examiner.*

G. L. LETT, J. J. MULROONEY, *Assistant Examiners.*